United States Patent [19]

Misono

[11] Patent Number: 5,365,502

[45] Date of Patent: Nov. 15, 1994

[54] OPTICAL DISC PLAYER HAVING A RESUME FUNCTION

[75] Inventor: Kousuke Misono, Kanagawa, Japan

[73] Assignee: Sony Corporation, Tokyo, Japan

[21] Appl. No.: 830,931

[22] Filed: Feb. 4, 1992

[30] Foreign Application Priority Data

Feb. 5, 1991 [JP] Japan .................. 3-014590

[51] Int. Cl.$^5$ ............................................ G11B 11/18
[52] U.S. Cl. ........................................ 369/18; 369/32; 369/33
[58] Field of Search ................ 369/18, 33, 32, 47, 369/48, 54; 300/27, 55, 19.1

[56] References Cited

U.S. PATENT DOCUMENTS

| | | | |
|---|---|---|---|
| 4,772,962 | 9/1988 | Tanaka et al. | 369/33 |
| 4,899,326 | 2/1990 | Takeya et al. | 369/33 |
| 5,168,481 | 12/1992 | Culbertson et al. | 369/33 |

*Primary Examiner*—Robert J. Pascal
*Assistant Examiner*—Tan Dinh
*Attorney, Agent, or Firm*—Limbach & Limbach

[57] ABSTRACT

An optical disc player which is comprised of a reproducing unit for reproducing an information recorded on an optical disc, a display unit for displaying information associated with the information reproduced from the optical disc, a first memory for storing therein playback position information of the optical disc at timing point in which the reproducing operation of the reproducing unit is interrupted, a second memory for storing therein information displayed on the display unit, a holding circuit for holding the display information stored in the second memory when the reproducing operation is interrupted, and a control circuit for reading the reproducing position information of the optical disc from the first memory when the reproducing operation is resumed by the reproducing unit and controlling the reproducing operation of the disc on the basis of the playback position information of the optical disc.

14 Claims, 6 Drawing Sheets

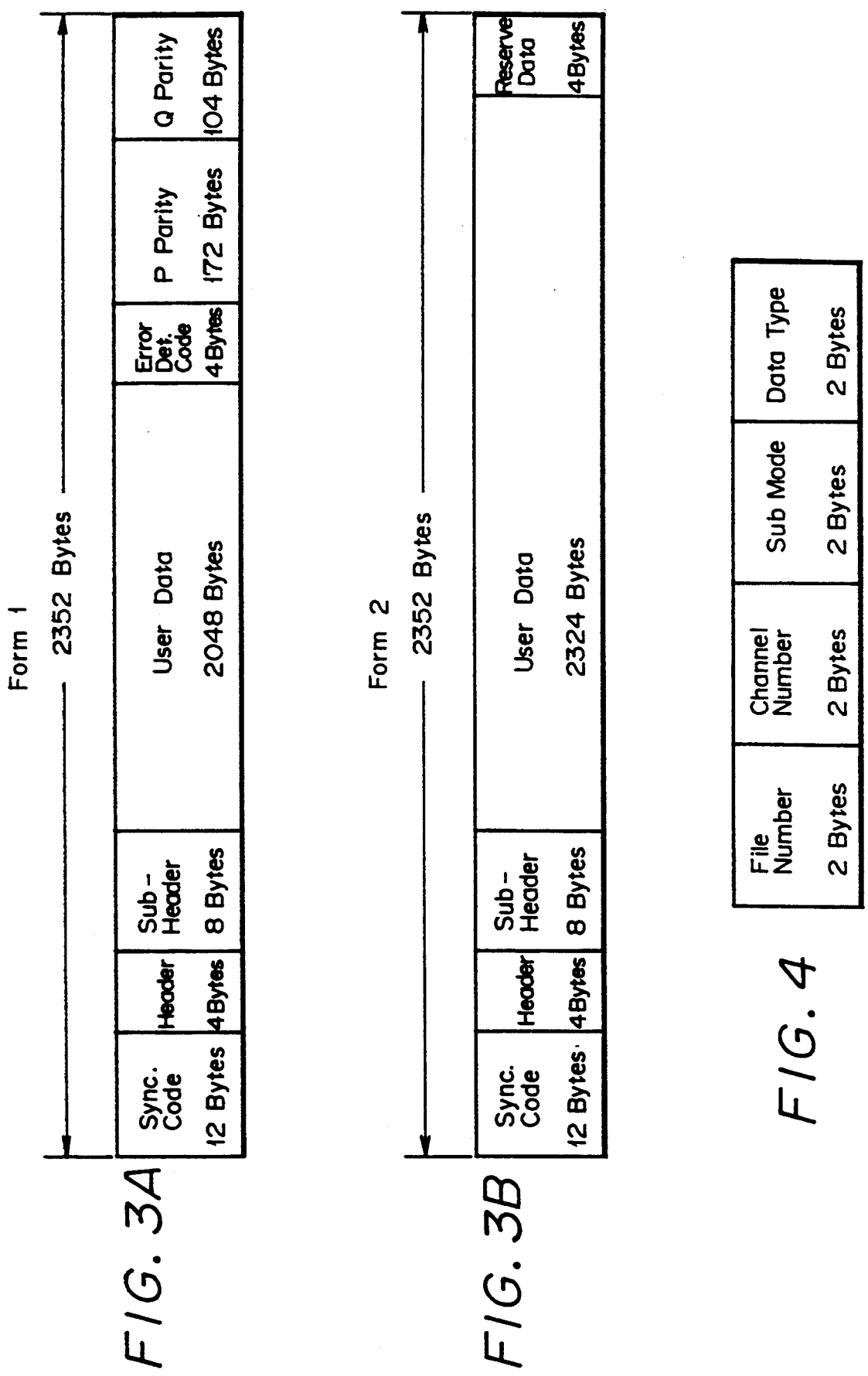

OPTICAL DISC PLAYER HAVING A RESUME FUNCTION

BACKGROUND OF THE INVENTION

1. Field of the Invention

The present invention generally relates to optical disc players and, more particularly, is directed to an optical disc player capable of reproducing a CD-I (CD-interactive media) disc on which video information or the like are recorded in addition to audio information.

2. Description of the Related

CD-I (CD-interactive media) systems have been proposed so far to record video data (natural picture, animation, computer graphics, etc.), text data, program data or the like in addition to audio data. This data is recorded on a CD (compact disc) and can be operated in an interactive fashion. Since the CD-I system has a playback function for playing back characters, video data, audio data, computer data and so on, it can be utilized in AV (audio visual) consumer appliances based on audio visual field, electronic edition based on characters, data base services based on information files, education and amusement based on interactive and answer system capabilities, as well as other applications. Therefore, the CD-I system is expected to become a widely used information system.

The CD-I system has various specifications set to maintain compatibility with other appliances so that it can be widely utilized at home. More specifically, the CD-I system employs a 16-bit CPU (central processing unit) and this CPU corresponds with a CPU 68000 (Motorola). Further, CD-RTOS (compact disc real-time operating system) based on the existing OS-9 is employed as a real time operating system for handling a variety of files. Furthermore, two trigger buttons and an X-Y device are employed as an input device. Audio and video systems are employed as an output system. In addition, the CD-I player is designed so as to reproduce a normal music compact disc (CD-DA).

In this CD-I player, it is frequently observed that for reasons of user convenience or other reasons, the reproduction of the disc must be interrupted during the execution of the application software (such as learning software, game software or the like). In this case, when the reproduction of the optical disc is resumed, it would be very convenient if the reproduction of the optical disc could be resumed from the state just before the point of the interruption. Therefore, the series of operations in the predetermined application software could be executed at a desired time in a desired time division manner, which in turn would make the optical disc player easier to handle.

OBJECTS AND SUMMARY OF THE INVENTION

Accordingly, it is an object of the present invention to provide an improved optical disc player in which the aforesaid shortcomings and disadvantages encountered with the prior art can be substantially eliminated.

More specifically, it is an object of the present invention to provide an optical disc player having a resume function.

Another object of the present invention is to provide an optical disc player which is easier to handle.

As an aspect of the present invention, an optical disc player is comprised of a reproducing unit for reproducing an information recorded on an optical disc, a display unit for displaying information associated with the information reproduced from the optical disc, a first memory for storing therein a playback position information for the disc at the timing point in which the reproducing operation of the reproducing unit is interrupted, a second memory for storing therein displayed information on the display unit, a holding circuit for holding the displayed information stored in the second memory when the reproducing operation is interrupted, and a control circuit for reading the playback position information of the disc from the first memory when the reproducing operation is resumed by the reproducing unit and controlling the reproducing operation of the optical disc on the basis of this playback position information of the optical disc.

When the reproducing operation of the optical disc is resumed, the playback position information, such as a track number and an absolute time, for the interrupted timing point stored in the first memory is read out and the reproduction of the optical disc is resumed from the state just before the interrupted timing point on the basis of the playback position information. As a result, the operation of the optical disc player becomes possible from the above-mentioned state.

BRIEF DESCRIPTION OF THE DRAWINGS

A better understanding of other objects, features, and advantages of the present invention will be gained from a consideration of the following detailed description of an illustrative embodiment thereof, in conjunction with the accompanying drawings, in which:

FIGS. 3A and 3B are diagrams showing formats of CD-I sector used in the present invention;

FIG. 4 is a schematic diagram showing an arrangement of a sub header used in the present invention;

DESCRIPTION OF THE PREFERRED EMBODIMENT

An embodiment of the present invention will hereinafter be described with reference to the accompanying drawings. In this embodiment, the present invention is applied to the CD-I player.

Figure 1:
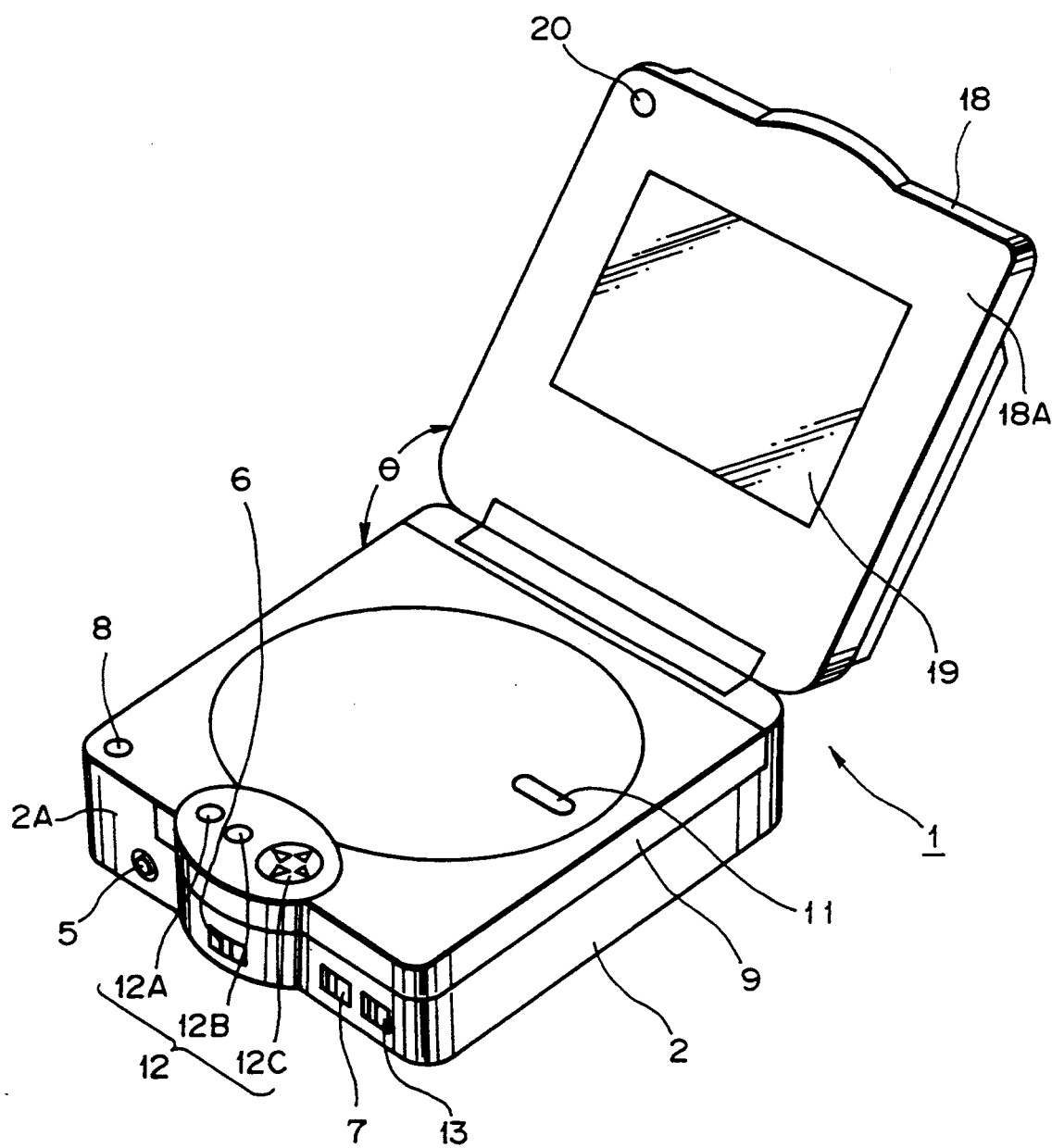
FIG. 1 is a perspective view illustrating an overall arrangement of an optical disc player according to an embodiment of the present invention with the middle lid closed.
Figure 2:
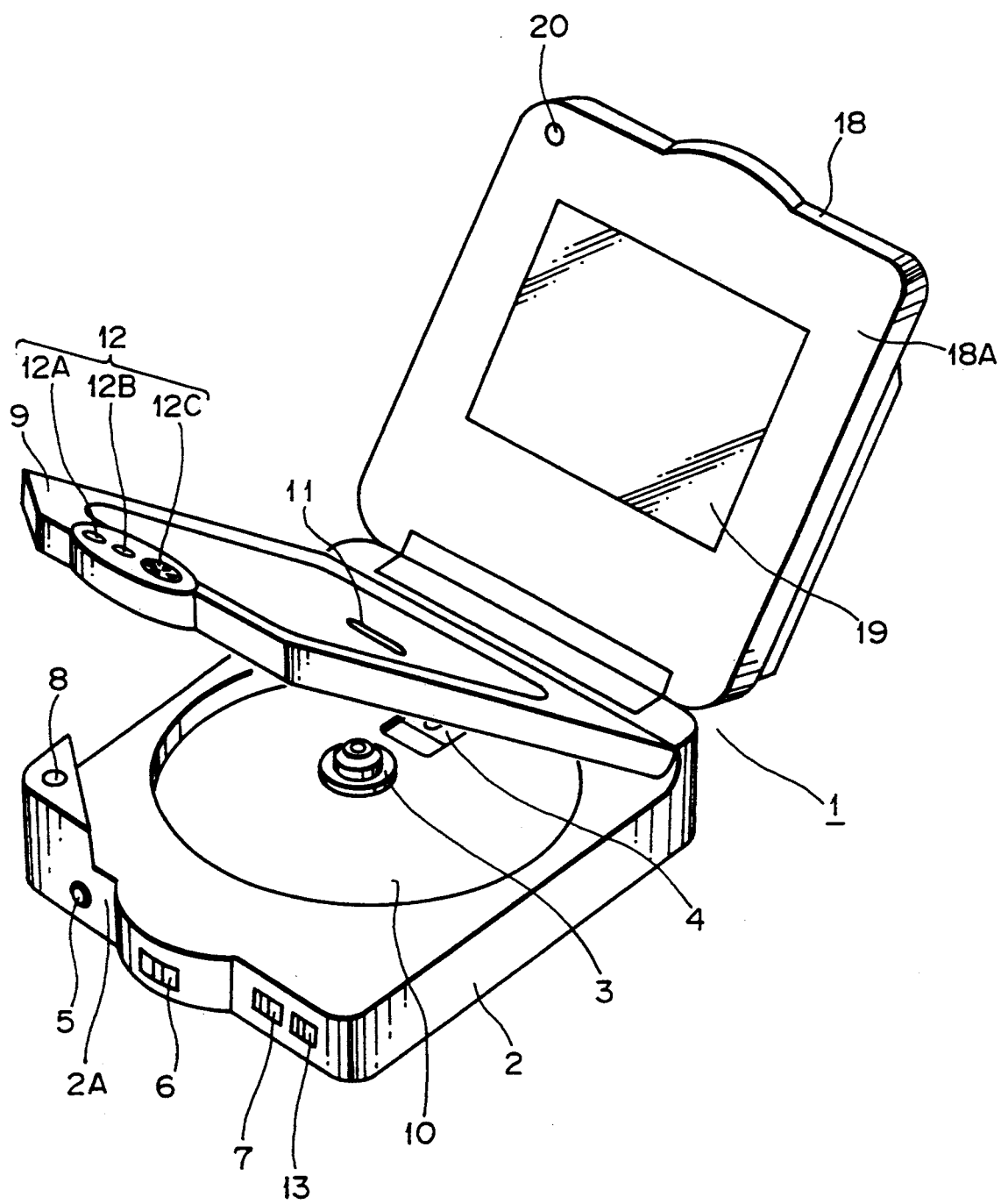
FIG. 2 is a perspective view illustrating the overall arrangement of the optical disc 'player according to the embodiment of the present invention with the middle lid opened.

FIGS. 1 and 2 are perspective views illustrating an overall arrangement of the embodiment of the CD-I player according to the present invention. The CD-I player 1 of this embodiment has a liquid crystal display (LCD) 19 unitarily formed therewith so that the user can carry this CD-I player I outdoors. Further, this CD-I disc player 1 can be miniaturized and reduced in weight by the use of parts fabricated as ICs, chips or the like. The overall dimension of the CD-I player 1 is 140 mm wide, 170 mm long and 60 mm high.

The CD-I player 1 has a player unit 2 the casing of which houses therein an optical disc drive unit for rotating a disc table 3 on which a disc is held, a pickup drive unit for moving an optical pickup 4 along the radial direction of the optical disc, a circuit board on which circuits for processing a reproduced signal from the optical pickup 4 are mounted, and a CPU corresponding to 68000 or the like.

A resume switch 13 is located on a front side wall 2A of the player unit 2 so as to control a resume function which is enabled by turning on the resume switch 13. That is, if the playback of the optical disc is resumed after the playback of the disc has been interrupted, then the playback of the optical disc begins from the state just before the playback of the disc was interrupted. The resume function is disabled by turning off the resume switch 13.

Further, a headphone jack 5, a volume control dial 6 and a power on-off switch 7 are located on the front side wall 2A of the player unit 2. As shown in FIG. 2, the front left corner portion of the player unit 2 is increased in thickness and an open button 8 is formed on the upper surface of the front left corner portion of the player unit 2.

A middle lid 9 is rotatably mounted on the player unit 2. If the above-mentioned open button 8 is depressed under the condition such that the middle lid 9 is closed as shown in FIG. 1, then the middle lid 9 is released from the engaged state by an engaging mechanism (not shown) provided on the front left corner portion of the player unit 2, thereby the middle lid 9 becomes set in the opened state as shown in FIG. 2. When the middle lid 9 is opened, the optical disc can be loaded or unloaded from a disc loading portion 10 with the disc table 3 mounted on the center in the player unit 2.

A window portion 11 made of a transparent material is formed on the middle lid g. According to this transparent window portion 11, the user can visually confirm the rotating state of the optical disc loaded on the disc loading portion 10 through the transparent window portion 11 even though the middle lid 9 is closed.

A pointing device 12 composed of trigger buttons 12A, 12B and an X-Y device 12C is provided on the front edge of the middle lid 9. The user can designate the positions of the optical disc in the X and Y directions by depressing parts (shown by triangles in FIG. 1) displaced in the upper, lower, left and right directions from the center. By this pointing device 12, the user can carry out a variety of operations concerning the playback of the disc or operations corresponding to the contents of application software. The user can carry out the input operation by visually confirming displayed information (not shown) on the liquid crystal display 19.

An outer lid 18 is rotatably joined to on the middle lid 9 and this outer lid 18 can be opened in a manual fashion. The outer lid 18 can be opened by 90 degrees or more and can be fixed in a predetermined opening angle $\theta$ as shown in FIG. 1. The 4-inch liquid crystal display 19, for example, is located on a rear or inner surface 18A of the outer lid 18. When the outer lid 18 is set in the opened state, the liquid crystal display 19 is exposed as shown in FIGS. 1 and 2 so that the user can watch the picture screen of the liquid crystal display 19.

An LCD drive switch 20 is provided on the rear surface 18A of the outer lid 18, and the liquid crystal display 19 can be turned on and off by operating the LCD drive switch 20.

The CD-I player 1 of this embodiment can reproduce the CD-I disc, a CD-I/CODA disc (disc formed by mixing the CD-I disc and CD-DA disc) and CD-DA disc (standard compact disc for playing back a musical program). The data format of the CD-I will be described below.

According to the CD-I, data can be recorded on the optical disc in the format based on the CD-ROM format and the recorded unit of data is a block similar to that of the CD-ROM. One block corresponds to 98 frames and the capacity of one block is expressed as:

6 (audio data number)×2 (stereo 2 channels)×2 (byte unit conversion)×98 (frame number) =2352 bytes The entire recording capacity of the CD-I disc becomes about 640 Megabytes for an optical disc of 12 cm in diameter.

Two forms of form 1 and form 2 are available as data structures of the CD-I and the forms 1 and 2 respectively correspond to mode 1 and mode 2 of the CD-ROM.

According to the mode 1 of the CD-ROM, an error detecting code and an error correcting code are added to data of one block so that a powerful error correction mechanism becomes possible, while according to the mode 2 in the CD-ROM, the error detecting code and the error correcting code are not added to data, thereby allowing a larger amount of user data. In the CD-I, the form 1 and the form 2 can be designated at every block and also the form 1 and the form 2 can be recorded on one optical disc in a mixed state.

The CD-I format is different from the CD-ROM format in that a sub-header of 8 bytes is provided at the starting portion of the user data. On this sub-header, respective blocks on which sound, picture and data are recorded are time-division-multiplexed at the block unit. Then, in order to process these data in a real time fashion, necessary data are written doubly and accommodated. The sub-header is composed of four items of file number, channel number, sub mode and data type.

FIG. 3A shows a data structure of form 1. In the data structure of form 1, a synchronizing (sync.) code (12 bytes) is provided at the head thereof which is followed by a header (4 bytes) and the sub-header (8 bytes), in that order. The subheader (8 bytes) is followed by user data (2048 bytes) to which there are added an error detection code EDC (4 bytes), P parity (172 bytes) and Q parity (104 bytes) for error correction. The form 1 is high in error correction capability and is therefore suitable for applications where data for which error interpolation is impossible, such as character data, program data, or the like, must be processed.

FIG. 3B shows a structure of the form 2. According to the form 2, a sync. code (12 bytes) is provided at the head thereof and the sync. code is followed by a header (4 bytes) and a subheader (8 bytes), in that order. The sub-header is followed by user data (2324 bytes) and a reserve area (4 bytes). This form 2 is suitable for processing data such as audio data, video data or the like in which error interpolation is possible.

The sub-header added to the starting portion of the user data is composed of the file number (2 bytes), the channel number (2 bytes), the sub mode (2 bytes) and the data type (2 bytes) as shown in FIG. 4.

Audio data is written in the CD-I disc in the following four modes:

According to a first mode, the audio data is written under the condition such that a sampling frequency is 44.1 kHz and the quantization bit number is 16 bits, which is the same as the recording system of the existing CD-DA. The first mode is intended to perform ultra-high fidelity playback.

A second mode employs an ADPCM (adaptive differential PCM (pulse code modulation)) as a recording system. In this mode, a sampling frequency is 37.8 kHz and a quantization bit number is 8 bits. The second mode can reproduce sound of quality substantially equal to that of the LP (long play) record. The playback time is 2 hours in the stereophonic mode and 4 hours in the monaural mode. The second mode is intended to perform high fidelity playback.

A third mode employs the ADPCM as a recording system, in which a sampling frequency is 37.8 kHz and a quantization bit number is 4 bits. According to the third mode, sound of quality substantially equal to that of FM broadcasting can be reproduced. A playback time of the third mode is 4 hours in the stereophonic mode and 8 hours in the monaural mode. The third mode is intended to perform high fidelity playback of long duration.

A fourth mode employs the ADPCM as a recording system, in which a sampling frequency is 18.9 kHz and a quantization bit number is 4 bits. A playback time is 8 hours in the stereophonic mode and 16 hours in the monaural mode. The fourth mode is intended to play back speech.

Video data are processed in accordance with the types of video data as follows:

In the case of the natural image, a sampling frequency of a luminance signal Y is selected to be 7.6 MHz, a sampling frequency of color difference signals U, V is selected to be 3.8 MHz and these luminance signal Y and color difference signals U, V are sampled at the ratio of 4:2:2. Then, (8 bits are compressed and recorded as 4 bits, while they are expanded to 8 bits upon playback.

In the case of the graphics data, a CLUT (color lookup table) is employed, and three modes of 256 colors (8 bits), 128 colors (7 bit) and 16 colors (4 bits) are available as CLUT graphics data. Therefore, in use, the user can select necessary colors from about 16800000 colors.

In the case of the animation, a run length code is employed. The run length code is used to compress image data by utilizing color data and consecutive pixel number. The animation can be realized on the full screen by using such run length code.

In the CD-I disc, mechanical dimensions such as dimension of outer diameter, dimension of central aperture, thickness or the like, optical parameters such as refractive index, reflectivity or the like, recording parameters such as disc rotation direction, recording linear velocity, shape of track, track pitch or the like, circumstance and situation in use are selected to be exactly the same as those of the ordinary compact disc (CD-DA) for music.

It is determined by the content of a TOC (table of contents) on the read-in area of the optical disc whether or not the optical disc is a CD-I disc. That is, in the CD-I disc or in the CD-I/CD-DA disc, PSEC is 10 when POINT=A0, while in other discs PSEC is 00 when POINT=A0. Accordingly, from the PSEC provided when POINT=A0, the type of the optical disc, i.e., whether the optical disc is the CD-I disc, the CD-I/CD-DA disc or other discs can be determined. Further, a control field of the CD-I disc when POINT=A0, A1, A2 is [01×0], while the control field of the CD-I/CD-DA disc when POINT=A0 is constantly [01×0] and the control field of other kinds of discs is [00×0]. Accordingly, it can be determined by the control field whether the optical disc is the CD-I disc or the CD-I/CD-DA.

The CD-I includes audio data and high speed processing which must be executed in a real time fashion so that the processing is executed by means of machine language. As a CPU for such high speed processing, 68000 type (Motorola) of 16-bit CPU developed by is appropriate. Further, CD-RTOS (real time operating system) which handles a variety of files is based on the 059 and the program therefor is stored in a ROM (read only memory), which is fabricated into the system. At least two trigger buttons and the X-Y device are prepared as the input device and two outputs are provided for audio and video systems. Furthermore, the CD-I player is designed so as to reproduce the CD-DA for music entertainment.

The inside arrangement of the CD-I player 1 will be described with reference to FIGS. 2, 5A and 5B.

Figure 5A:
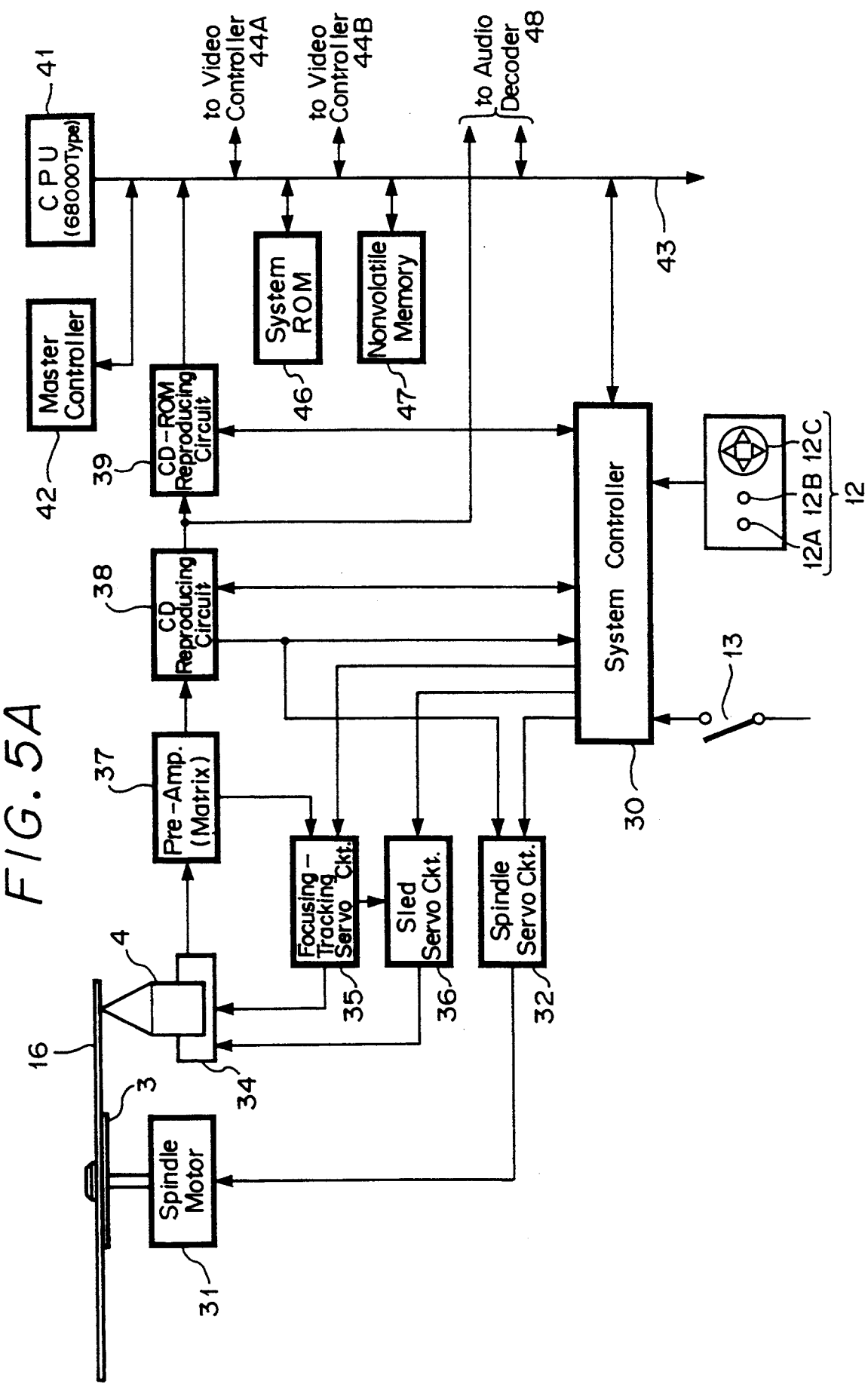
FIGS. 5A and 5B are respectively schematic block diagrams showing an inside structure of the optical disc player according to the embodiment of the present invention.
Figure 5B:
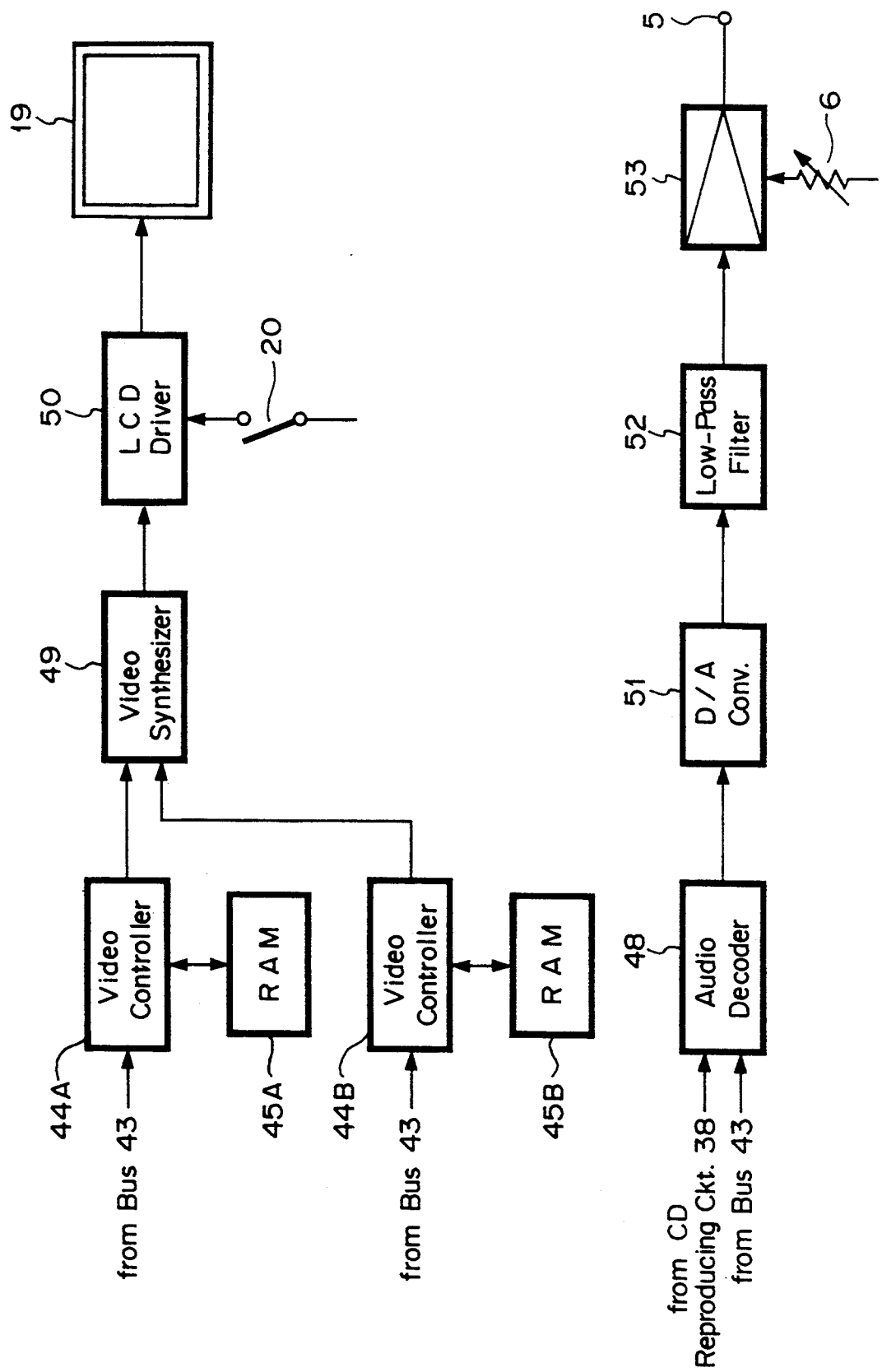

Referring to FIG. 5A, the disc table 3 on which an optical disc 16 is loaded is rotated at a constant linear velocity (i.e., in a CLV fashion) by a spindle motor 31 upon playback and the rotation of the spindle motor 31 is controlled by a spindle servo circuit 32. More specifically, a clock signal reproduced by a CO reproducing circuit 38 and a reference signal from a system controller 30 are supplied to a servo circuit 32, in which they are phase-compared to provide a phase error signal. Then, the rotation of the spindle motor 31 is controlled on the basis of the phase error signal.

A pointing device 12 (including at least two trigger buttons 12A, 12B and an X-Y device 12C) is coupled to the system controller 30. If the pointing device 12 is operated while the middle lid 9 is closed, then the optical disc 16 is rotated to start the playback operation.

A recorded signal on the optical disc 16 is played back by the optical pickup 4. The optical pickup 4 is supported by a biaxial device (not clearly shown) and the biaxial device is controlled by a focusing-tracking servo circuit 35. That is, a focusing error signal and a tracking error signal are detected from the reproduced signal of the optical pickup 4 by a preamplifier (matrix) 37 and these focusing error signal and tracking error signal are supplied to the focusing-tracking servo circuit 35, thereby the optical pickup 4 being servo-controlled with respect to two axial directions, i.e., the focusing direction and the tracking direction.

The optical pickup 4 can be moved along the radial direction of the optical disc 16 by a slide feeding mechanism 34 utilizing a linear motor, for example, and this slide feeding mechanism 34 which is controlled by the sled servo circuit 36. A DC tracking error can be adjusted by controlling the slide feeding mechanism 34 by means of a servo circuit.

Operation of the servo circuits 35, 36 are controlled by the system controller 30 so that the optical pickup 4 can access a desired track position on the optical disc 16 by the track jump or the like.

The reproduced signal from the optical pickup 4 is supplied through the pre-amplifier 37 to the CD reproducing circuit 38. The CD reproducing circuit 38 is composed of a bit clock reproducing circuit, an EFM (eight-to-fourteen modulation) demodulating circuit, a CIRC (cross interleave redundancy check) error correcting circuit or the like. The reproduced signal from the optical pickup 4 is EFM-demodulated by the CD reproducing circuit 38 and also error-corrected therein. Operation of the CD reproducing circuit 38 is controlled by the system controller 30. Control data such as sub-code data or the like detected by the CD reproducing circuit 38 are supplied to the system controller 30 and there utilized to determine the kind of discs and access control of the optical pickup 4.

An output of the CD reproducing circuit 38 is supplied to a CD-ROM reproducing circuit 39 and the CD-ROM reproducing circuit 39 is comprised of a sync. (synchronizing) detecting circuit, a descramble circuit, an error correcting circuit or the like. The CD-ROM reproducing circuit 39 detects a sync. signal and descrambles the scrambled data. Further, the CD-ROM reproducing circuit 39 checks the header address to access a target block. In the case of the form 1, the CD-ROM reproducing circuit 39 carries out the error correction. The operation of the CD-ROM reproducing circuit 39 is controlled by the system controller 30.

A CPU 41 is adapted to control the CD-I system. One illustrative type of appropriate CPU is the 68000 CPU (Motorola). The CPU 41 is coupled with a master controller 42. The CPU 41 is coupled to the system controller 30 in a bidirectional fashion. A bus 43 is led out from the CPU 41, and the CPU 41 and the master controller 42 may be fabricated as a one chip IC.

Data reproduced by the CD-ROM reproducing circuit 39 are supplied to the bus 43 RAMs 45A, 45B are also connected through video controller 44A, 44B to the bus 43. Also, the bus 43 is connected in a bidirectional fashion with a system ROM 46 and a backing-up nonvolatile memory RAM 47. Further, an audio decoder 48 is coupled to the bus 43.

Of data reproduced by the CD-ROM reproducing circuit 39, video data is supplied to the video controllers 44A, 44B under the control of the CPU 41, whereby video signals are formed on the basis of the video data. The video signals formed by the video controllers 44A, 44B are supplied to and synthesized by a video synthesizer 49. A synthesized video signal from the video synthesizer 49 is supplied through an LCD driver circuit 50 to the liquid crystal display 19 which then displays an image thereon. The LCD driver switch 20 for turning on and off the liquid crystal display 19 is connected to the LCD driver circuit 50.

Of the data reproduced by the CD-ROM reproducing circuit 39, audio data is supplied to the audio decoder 48 under the control of the CPU 41. The audio decoder 48 is also supplied with audio data reproduced by the CD reproducing circuit 38. If the audio data is processed in an ADPCM manner, then the audio data thus ADPCM-processed is decoded by the audio decoder 48. The audio data from the audio decoder 48 is converted into an analog signal by a digital-to-analog (D/A) converter 51 and this analog signal is supplied through a low-pass filter (LPF) 52 and an amplifier 53 to an output terminal (headphone jack) 5. Level of the audio signal developed at the output terminal 5 is set by the volume control dial 6.

As shown in FIG. 5A, the resume switch 13 is connected to the system controller 30. When this resume switch 13 is turned on, then this optical disc player is set in the mode such that the resume function is made operable (i.e., resume ON). When the resume switch 13 is turned off, then the optical disc player Is set in the mode such that the resume function is disabled (i.e., resume OFF).

Figure 6:
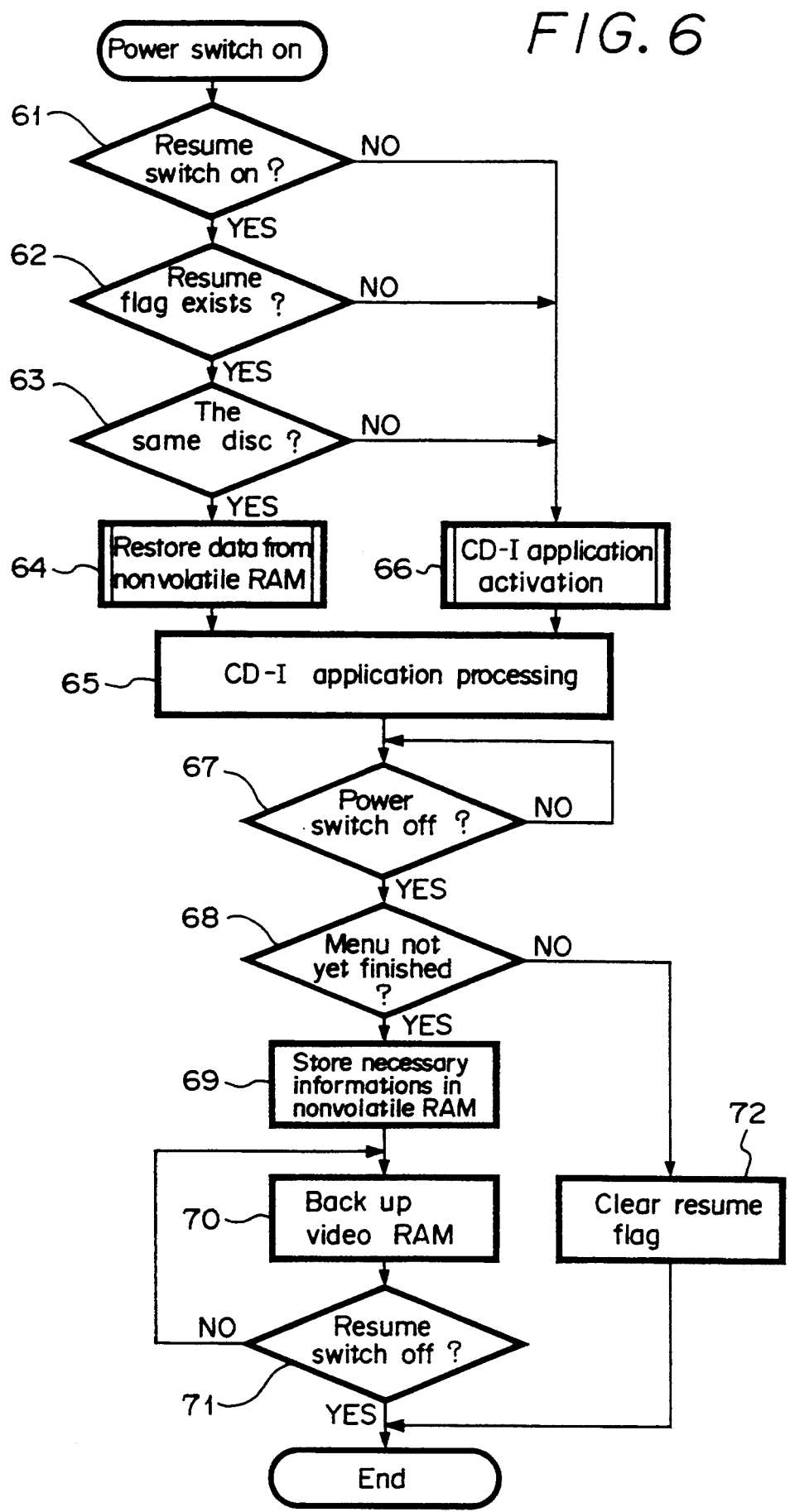
FIG. 6 is a flowchart to which references will be made in explaining a resume function of the optical disc player according to the present invention.

FIG. 6 shows a flowchart of the resume function processing. Referring to FIG. 6, following the start of operation, that is, the power on, it is determined in the next decision step 61 whether or not the resume switch 13 is turned on. If the resume switch 13 is turned on as represented by a YES at decision step 61, then the processing proceeds to the next decision step 62. It is determined in decision step 62 whether or not the resume flag exists in the nonvolatile RAM 47. If the resume flag exists in the nonvolatile RAM 47 as represented by a YES at decision step 62, then the processing proceeds to the next decision step 63. In decision step 63, it is determined whether or not the optical disc 16 ready for reproduction is the same as the previous optical disc in use at the time of the interruption (the previous disc). This decision is made by comparing the TOC (table of contents) information reproduced from the innermost periphery of the optical disc which is ready for reproduction with TOC information from the previous disc. Note that the TOC information for the previous disc has been stored for the purpose of this comparison in the nonvolatile RAM 47.

If the optical disc 16 ready for reproduction is the same as the previous disc as represented by a YES at decision step 63, then the processing proceeds to step 64, whereat the optical disc playback position information such as track number, absolute time or the like stored at the timing point at which the playback of the previous optical disc is interrupted is restored (i.e., loaded) from the nonvolatile RAM 47.

Then, on the basis of the playback position information, the playback of the optical disc 16 is started from the position just before the timing point of the playback interruption and the output processing corresponding to the application software is carried out by the CPU 41 in step 65. The display on the liquid crystal display 19 or the like is resumed from the state just before the timing point in which the playback of the optical disc is interrupted.

If the resume switch 13 is not turned on as represented by a NO at decision step 61 or, if the resume flag does not exist in the nonvolatile memory 47 as represented by a NO at decision step 62 or if the optical disc 16 reproduced is not the same as the previous optical disc as represented by a NO at decision step 63, then the optical disc 16 is reproduced from the starting portion thereof in response to the playback operation of the pointing device 12 and the application is initialized at step 66. Then, in the next step 65, the output processing corresponding to the application software is carried out by the CPU 41.

In the next decision step 67, it is determined whether or not the power switch is turned off. If the power switch is turned off as represented by a YES at decision step 67, then the processing proceeds to the next decision step 68. It is determined in decisions step 68 whether or not the menu is being processed. If the menu is being processed as represented by a YES at decision step 68, then the processing proceeds to the next step 69, whereat necessary information, i.e., the track number of the disc reproducing position, reproducing position information of absolute time or the like and TOC information of the reproduced optical disc 16 are stored in the nonvolatile RAM 47. In the next step 70, information which is stored in the RAMs 45A, 45B and displayed on the liquid crystal display 19, is backed up (refreshed).

It is determined in the next decision step 71 whether or not the resume switch 13 is turned off. If the resume switch 13 is not turned off as represented by a NO at decision step 71, then the processing returns to step 70, whereat the back-up of the displayed information is continued. Thus, the display information is held, and can be utilized to reduce the activating time to the display operation of the liquid crystal display 19 when the playback of the optical disc 16 is started again.

If the resume switch 13 is turned off as represented by a YES at decision step 71, then the resume function processing is ended. Further, if the menu is not being processed as represented by a NO at decision step 68, then the processing proceeds to the next step 72, whereat the resume flag in the nonvolatile RAM 47 is cleared, and then the resume function processing is ended.

As described above, according to the embodiment of the present invention, by turning on the resume switch 13, the resume function can be made operable so that, when the playback operation of the optical disc is resumed after the playback of the optical disc was interrupted, the playback of the optical disc is started from the state just before the playback of the optical disc was interrupted. Accordingly, the user can recommence operation from the state which existed just prior to playback interruption with ease and without special operations. Therefore, a series of operation in the application software such as a learning software or the like can be executed over intervals of time desired by the users.

Further, according to the embodiment of the present invention, when the playback of the optical disc is interrupted by turning off the power switch, the displayed informations stored in the RAMs 45A, 45B are backed up, held and then utilized in order to resume the reproducing operation of the optical disc. Therefore, the display on the liquid crystal display 19 can be quickly re-activated.

According to the present invention, when the playback operation of the optical disc is resumed, the playback of the optical disc is started from the state just before the playback interruption on the basis of the playback position information of the optical disc at the interrupted timing point which is stored in the first memory. As a result, the user can easily carry out the operation following the state just before the interrupted timing point. Accordingly, a series of operations in the application software, such as a learning software or the like, can be carried out over intervals of time desired by the users. Therefore, the optical disc player of the present invention becomes easier to handle.

Furthermore, since the displayed information at the interrupted timing point is stored in the second memory and the information can be effectively utilized when the playback operation of the optical disc is resumed, the display on the display unit can be effected smoothly.

Having described the preferred embodiment of the invention with reference to the accompanying drawings, it is to be understood that the invention is not limited to that precise embodiment and that various changes and modifications thereof could be effected by one skilled in the art without departing from the spirit or scope of the invention as defined in the appended claims.

What is claimed is:

1. An optical disc player comprising:
   (a) reproducing means for reproducing information recorded on an optical disc;
   (b) display means for displaying information reproduced from said optical disc;
   (c) first memory means for storing therein a playback position information of said optical disc at a timing point when a reproducing operation of said reproducing means is interrupted;
   (d) second memory means for storing therein displayed information displayed on the display means;
   (e) holding means for causing the displayed information stored in said second memory means at a timing point when said reproducing operation is interrupted to be continuously refreshed; and
   (f) control means for reading the playback position information of said the optical disc from said first memory means when the reproducing operation is resumed by said reproducing means and controlling the reproducing means to resume reproduction of said optical disc at a location on the optical disc designated by the playback position information and controlling the display means to resume a display of the information stored in the sound memory means at the timing point when the reproducing operation was interrupted.

2. An optical disc player according to claim 1, wherein the control means includes a resume switch means so that, only if said resume switch means is turned on, will the reproduction of said optical disc be controlled on the basis of the playback position information when the reproducing operation is resumed.

3. An optical disc player according to claim 1, wherein said reproducing means is comprised of a CD (compact disc) reproducing circuit and a CD-ROM (read only memory) reproducing circuit connected to said control means.

4. An optical disc player according to claim 1, wherein said first memory means is comprised of a nonvolatile RAM (random access memory).

5. An optical disc player according to claim 1, wherein said second memory means is comprised of RAMs.

6. An optical disc player according to claim 1, wherein said control means is a microcomputer.

7. An optical disc player according to claim 1, wherein the information reproduced from said optical disc by said reproducing means is audio data and video data.

8. An optical disc player according to claim 1, wherein said playback position information comprises a track number and an absolute time.

9. An optical disc player according to claim 1, wherein said display means is comprised of an LCD (liquid crystal display) and an LCD driver.

10. An optical disc player according to claim 1, wherein said optical disc is one of either a CD-I disc or a CD-I/CD-DA disc.

11. An optical disc player according to claim 1, wherein the information reproduced from said optical disc by said reproducing means is interactive video data.

12. A method of reproducing an optical disc on which at least video information is recorded, comprising the steps of:
   (a) reproducing information recorded on an optical disc;

(b) displaying the information reproduced from the optical disc;
(c) interrupting the reproducing of the information recorded on the optical disc;
(d) storing a playback position information of the optical disc at a timing point when the reproducing of the information recorded on the optical disc is interrupted;
(e) storing currently displayed information at the timing point when the reproducing of the information recorded on the optical disc is interrupted; and
(f) resuming reproducing information recorded on the optical disc by reading the stored playback position information of the optical disc, reproducing information recorded on the optical disc beginning at a location on the optical disc designated by the playback position information and resuming a display of the information stored at the timing point when the reproducing of the information recorded on the optical disc was interrupted.

13. A method of reproducing an optical disc according to claim 12, further comprising the steps of:
(a) setting a flag in a memory if a resume operation is to take place subsequent to an interruption in reproducing information recorded on an optical disc; and
(b) checking the flag prior to the resuming step and only proceeding with the resuming step if the flag is set.

14. A method of reproducing an optical disc according to claim 12, further comprising the step of determining, prior to the resuming step, if a current optical disc to be reproduced is a same optical disc which was being reproduced at the timing point when the reproducing of the information recorded on the optical disc was interrupted, and only proceeding with the resuming step if the result is affirmative.

* * * * *